United States Patent
Parker et al.

(10) Patent No.: US 10,363,786 B1
(45) Date of Patent: Jul. 30, 2019

(54) BALL SOCKET ASSEMBLY WITH A LOW FRICTION BEARING

(71) Applicant: Federal-Mogul Motorparts LLC, Southfield, MI (US)

(72) Inventors: Glen C. Parker, Saint Peters, MO (US); Eric Kopsie, Bethalto, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 15/933,684

(22) Filed: Mar. 23, 2018

(51) Int. Cl.
*F16C 11/06* (2006.01)
*B60G 7/00* (2006.01)

(52) U.S. Cl.
CPC .............. *B60G 7/005* (2013.01); *F16C 11/06* (2013.01); *B60G 2204/416* (2013.01); *F16C 2326/05* (2013.01)

(58) Field of Classification Search
CPC .. F16C 17/04; F16C 11/0619; F16C 11/0623; F16C 11/0628; F16C 11/0633; F16C 11/0638; F16C 11/0642; F16C 11/08; F16C 19/10; F16C 19/12; F16C 19/30; F16C 19/305; F16C 19/32; F16C 21/00; F16C 21/005; F16C 33/1065; B60G 7/005; B06G 2204/416
See application file for complete search history.

(56) References Cited

U.S. PATENT DOCUMENTS

| 1,908,789 | A |  | 10/1928 | Ragan |  |
|---|---|---|---|---|---|
| 2,037,786 | A |  | 8/1934 | Hufferd |  |
| 2,065,589 | A | * | 12/1936 | Hufferd | F16C 11/0604 403/127 |
| 2,388,950 | A | * | 11/1945 | Booth | F16C 11/0604 403/127 |
| 2,396,137 | A | * | 3/1946 | Venditty | F16C 11/0604 403/127 |
| 2,593,253 | A |  | 12/1947 | Booth |  |
| 2,494,739 | A | * | 1/1950 | Booth | F16C 11/0609 403/127 |
| 2,544,583 | A | * | 3/1951 | Booth | F16C 11/0609 403/127 |

(Continued)

FOREIGN PATENT DOCUMENTS

| FR | 964901 A | 8/1950 |
|---|---|---|
| FR | 1049045 A | 12/1953 |
| WO | 2016089819 A1 | 6/2016 |

OTHER PUBLICATIONS

International Search Report, dated May 28, 2019 (PCT/US2019/023326).

*Primary Examiner* — Alan B Waits
(74) *Attorney, Agent, or Firm* — Robert L. Stearns; Dickinson Wright, PLLC

(57) ABSTRACT

The socket assembly includes housing with an inner bore which extends along a central axis from a closed first end to an open second end. A ball portion of a ball stud is disposed in the inner bore of the housing, and a shank portion of the ball stud projects out of the housing through the open second end. A backing bearing is disposed in the inner bore and slidably supports the ball portion of the ball stud. A roller bearing or a pair of thrust washers is disposed in the inner bore of the housing and operatively supports the backing bearing to allow low friction rotation of the backing bearing relative to the housing.

9 Claims, 6 Drawing Sheets

(56) References Cited

U.S. PATENT DOCUMENTS

| | | | | |
|---|---|---|---|---|
| 2,797,930 | A | * | 7/1957 | Booth ................... B60G 7/005 280/124.134 |
| 2,873,130 | A | * | 2/1959 | Moskovitz .......... F16C 11/0604 403/127 |
| 2,913,268 | A | * | 11/1959 | Booth ................... B60G 7/005 403/127 |
| 2,957,713 | A | | 10/1960 | Herbenar |
| 2,971,770 | A | | 2/1961 | Wagner |
| 3,418,011 | A | | 12/1968 | Scheublein, Jr. et al. |
| 3,988,818 | A | | 11/1976 | Allison |
| 3,999,872 | A | | 12/1976 | Allison |
| 4,028,784 | A | | 6/1977 | Allison |
| 4,057,355 | A | | 11/1977 | Allison |
| 4,059,361 | A | | 11/1977 | Allison |
| 4,063,834 | A | | 12/1977 | Hanson et al. |
| 4,070,121 | A | | 1/1978 | Graham |
| 4,824,344 | A | * | 4/1989 | Kimura ............... F04C 18/0215 384/369 |
| 4,854,745 | A | * | 8/1989 | Kamimura ........... B60G 15/068 384/420 |
| 4,969,752 | A | * | 11/1990 | Kubota ................ B60G 15/068 384/124 |
| 5,476,326 | A | * | 12/1995 | Ueno ................... B60G 15/067 384/125 |
| 5,564,853 | A | * | 10/1996 | Maughan ............ F16C 11/0619 29/441.1 |
| 6,439,794 | B2 | | 8/2002 | Schmidt |
| 8,256,980 | B2 | * | 9/2012 | Walter ................ F16C 11/0695 280/93.511 |
| 8,616,799 | B2 | * | 12/2013 | Ersoy ................... B60G 7/005 403/137 |
| 8,714,862 | B2 | | 5/2014 | Mevorach et al. |
| 8,757,648 | B1 | * | 6/2014 | Winter ................ B60G 7/001 280/124.134 |
| 9,290,997 | B2 | * | 3/2016 | Flores ................... E21B 10/23 |
| 9,291,195 | B1 | | 3/2016 | Parker et al. |
| 9,291,196 | B2 | | 3/2016 | Ersoy et al. |
| 9,316,250 | B2 | * | 4/2016 | Elterman ............ F16C 11/0604 |
| 9,464,663 | B2 | * | 10/2016 | Belleau ............... F16C 11/0623 |
| 2004/0028303 | A1 | * | 2/2004 | Ueno ..................... F16C 17/10 384/276 |
| 2007/0116391 | A1 | * | 5/2007 | Watai ................... B60G 11/16 384/420 |
| 2011/0135228 | A1 | * | 6/2011 | Kaneko ............... B60G 15/068 384/420 |
| 2011/0194793 | A1 | * | 8/2011 | Kaneko ............... B60G 15/068 384/368 |
| 2012/0080230 | A1 | * | 4/2012 | Flores ................... E21B 10/23 175/57 |
| 2013/0121756 | A1 | * | 5/2013 | Mevorach .......... F16C 11/0642 403/144 |
| 2013/0334006 | A1 | * | 12/2013 | Stern ..................... F16C 17/04 192/107 M |
| 2014/0119682 | A1 | * | 5/2014 | Morishige .............. F16C 17/04 384/368 |
| 2014/0205366 | A1 | | 7/2014 | Mevorach et al. |
| 2014/0355915 | A1 | * | 12/2014 | Saito ................... B60G 15/068 384/368 |
| 2018/0058499 | A1 | * | 3/2018 | Sundararaman ...... F16C 33/107 |

* cited by examiner

US 10,363,786 B1

BALL SOCKET ASSEMBLY WITH A LOW FRICTION BEARING

BACKGROUND OF THE INVENTION

1. Field of the Invention

The present invention is generally related to ball socket assemblies, such as for vehicle suspension assemblies.

2. Related Art

In some automotive applications, two moveable ball socket assemblies are used in unison with each other to support each of the front wheels. Each socket assembly has a housing with an inner bore; one or more bearings received in the inner bore; and a ball stud with a ball portion and a shank portion. In such applications, the ball studs within those socket assemblies are aligned axially with one another. The bearing or bearings support the ball portion to allow the ball stud and the housing to rotate relative to one another about the axis. The ball socket assemblies must be seated uniformly during installation to minimize turning torque when under load.

SUMMARY OF THE INVENTION AND ADVANTAGES

One aspect of the present invention is related to a socket assembly that includes a housing with an inner bore which extends along a central axis from a closed first end to an open second end. A ball portion of a ball stud is disposed in the inner bore of the housing, and a shank portion of the ball stud projects out of the housing through the open second end. A backing bearing is disposed in the inner bore and slidably supports the ball portion of the ball stud. A roller bearing is disposed in the inner bore of the housing and operatively supports the backing bearing to allow low friction rotation of the backing bearing relative to the housing.

The roller bearing assembly drastically reduces the torque required to rotate the ball stud and housing relative to one another about the central axis as compared to other known socket assemblies. When employed in a vehicle suspension/steering assembly to interconnect a control arm with a steering knuckle, this reduced friction allows for a reduced potential of steering returnability issues in a vehicle.

According to a further aspect of the present invention, the roller bearing assembly is in direct contact with the backing bearing.

According to another aspect of the present invention, the roller bearing assembly includes a plurality of needle rollers that are spaced circumferentially from one another.

According to yet another aspect of the present invention, the roller bearing further includes a cage with a plurality of openings that receive the needle rollers.

According to still another aspect of the present invention, a washer spring is disposed in the inner bore between the roller bearing assembly and the closed first end of the housing for biasing the backing bearing against the ball portion of the ball stud.

According to a further aspect of the present invention, the washer spring is elastically deformed such that it has a substantially planar first surface.

According to yet a further aspect of the present invention, the needle rollers are in direct contact with the substantially planar first surface of the washer spring such that the needle rollers can roll along the washer spring.

According to still a further aspect of the present invention, the backing bearing is able to move in a radial direction within the inner bore of the housing.

According to another aspect of the present invention, an exit bearing is disposed in the inner bore of the housing and supports an opposite hemisphere of the ball portion of the ball stud from the backing bearing.

Another aspect of the present invention is related to a socket assembly that includes a housing with an inner bore which extends along a central axis from a closed first end to an open second end. A ball portion of a ball stud is disposed in the inner bore, and a shank portion of the ball stud projects out of the housing through the open second end. A backing bearing is disposed in the inner bore and slidably supports the ball portion of the ball stud. A pair of thrust washers are disposed in the inner bore between the closed first end of the housing and the backing bearing to allow low friction rotation of the backing bearing relative to the housing.

According to another aspect of the present invention, one of the thrust washers is in direct contact with the backing bearing.

According to yet another aspect of the present invention, a washer spring is disposed in the inner bore of the housing between the thrust washers and the closed first end of the housing, and the one of the thrust washers that is not in direct contact with the backing bearing is in direct contact with the washer spring.

According to still another aspect of the present invention, each of the thrust washers has a plurality of radially extending grooves for distributing lubricant.

According to a further aspect of the present invention, the backing bearing is able to move in a radial direction within the inner bore of the housing.

BRIEF DESCRIPTION OF THE DRAWINGS

These and other features and advantages of the present invention will be readily appreciated, as the same becomes understood by reference to the following detailed description when considered in connection with the accompanying drawings wherein.

DETAILED DESCRIPTION OF THE ENABLING EMBODIMENTS

Figure 1:
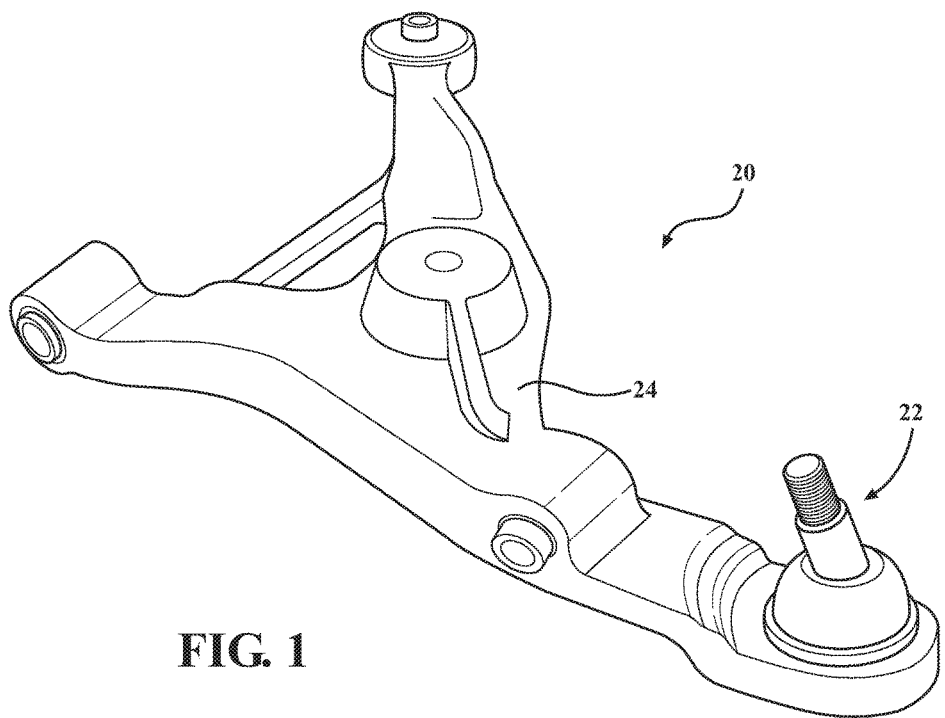
FIG. 1 is a perspective view of a control arm that includes a socket assembly which is constructed according to one aspect of the present invention.

Referring to the Figures, wherein like numerals indicate corresponding parts throughout the several views, a control arm assembly 20 which includes a first exemplary embodiment of an improved socket assembly 22 is generally shown in FIG. 1. In the exemplary embodiment, the socket assembly 22 is a compression loaded ball joint which is configured to join a control arm body 24 with a knuckle (not shown) in the front suspension assembly of a vehicle. Although shown as a component of a control arm assembly 20, it should be appreciated that the socket assembly 22 could find uses in other automotive and non-automotive applications.

Figure 2:
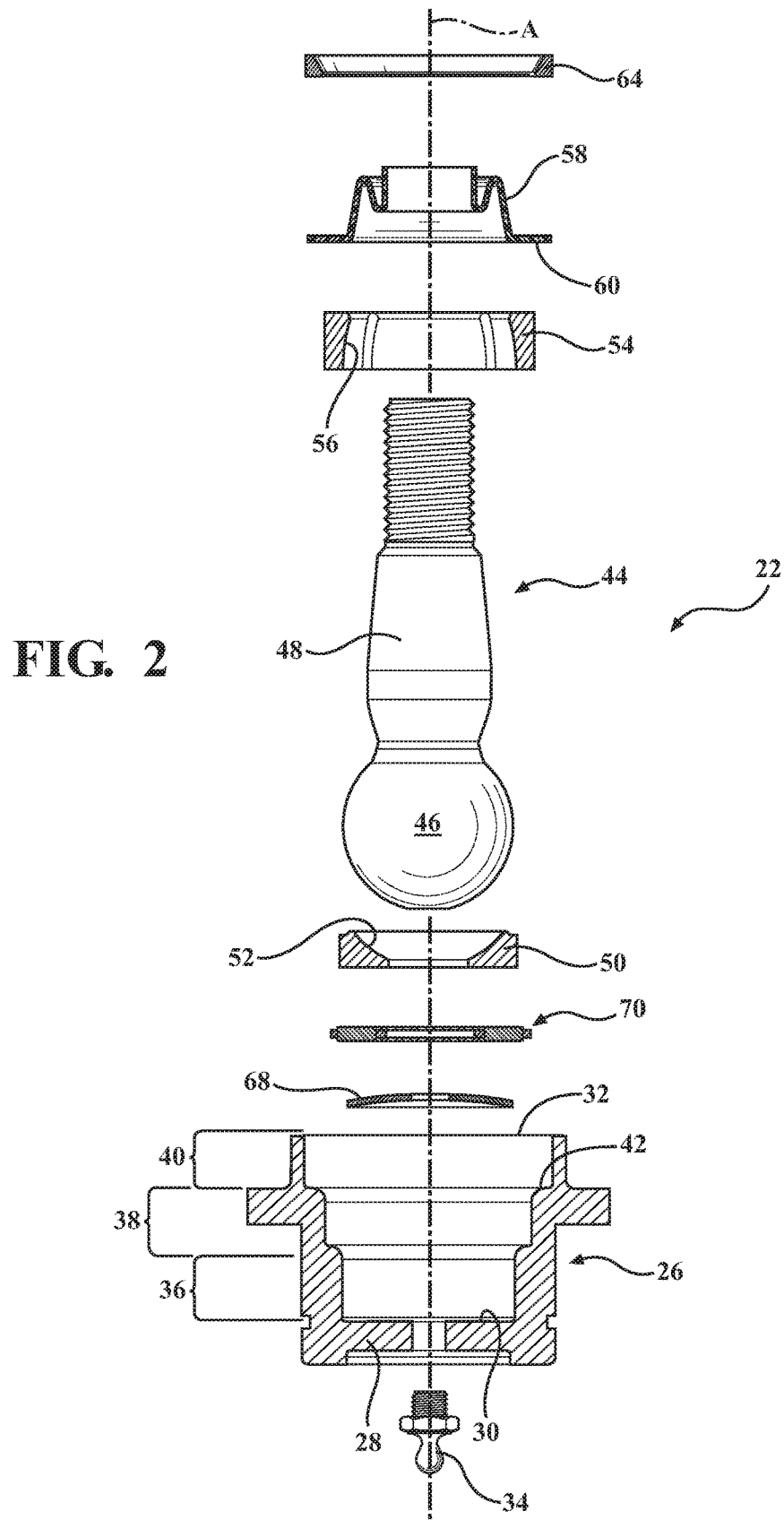
FIG. 2 is an exploded and partially cross-sectional view of a first exemplary embodiment of the socket assembly.
Figure 3:
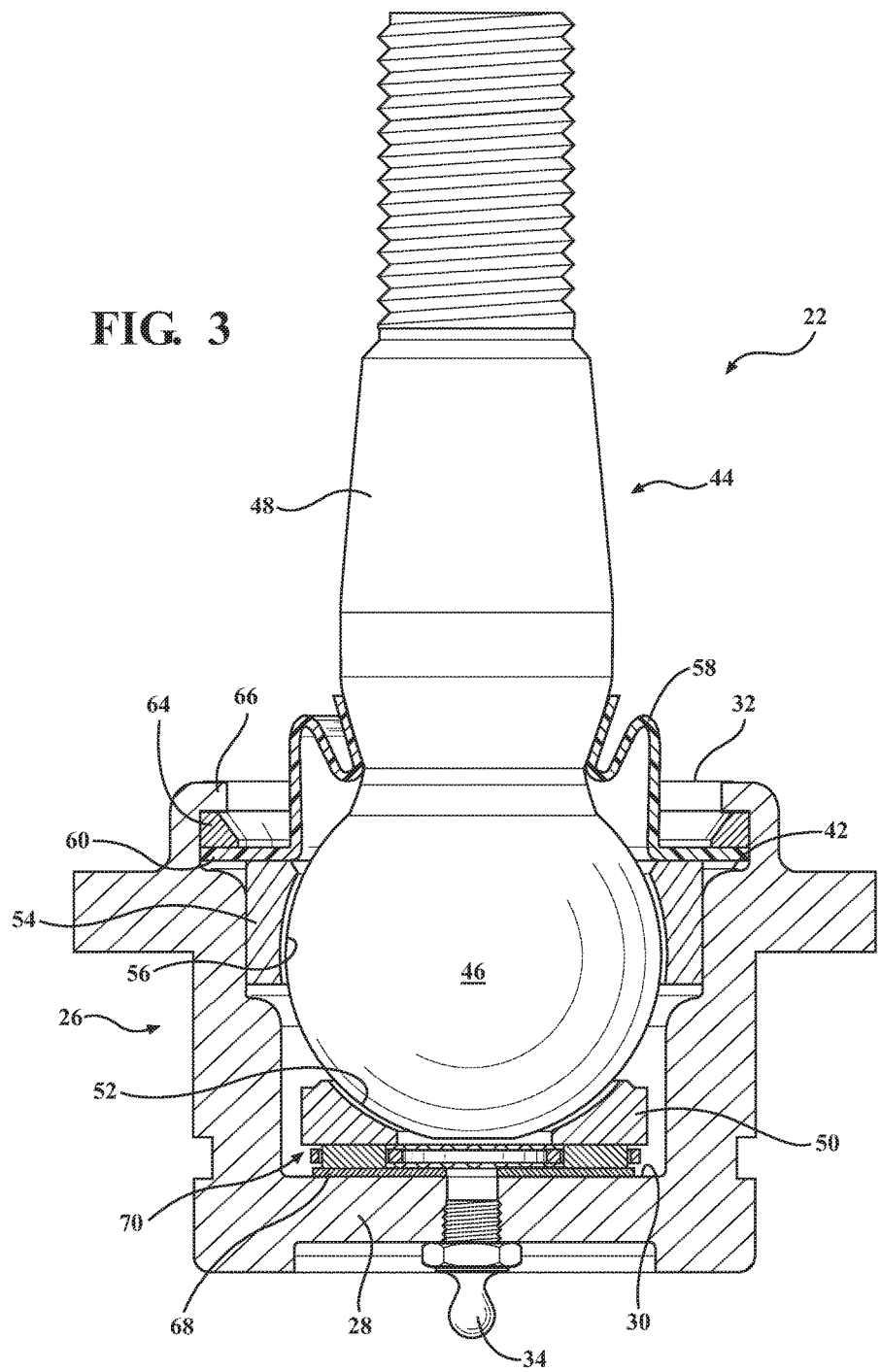
FIG. 3 is a partially cross-sectional view of the socket assembly of FIG. 2 in an assembled state.
Figure 4:
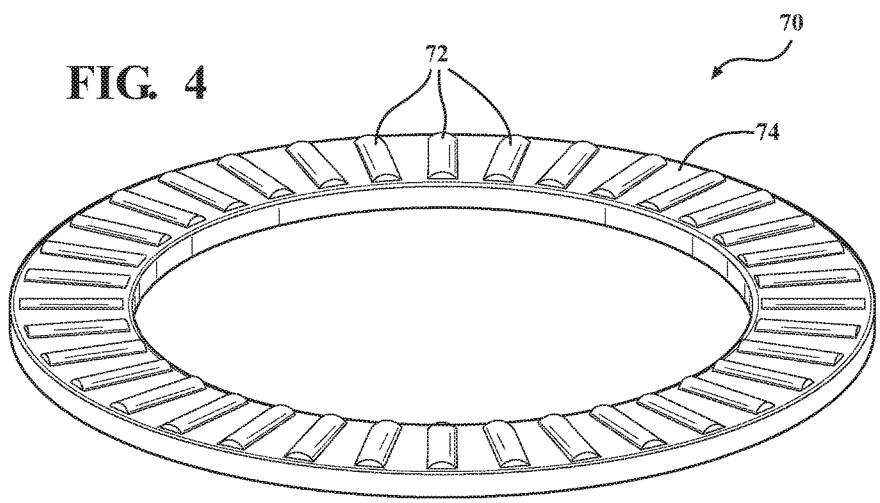
FIG. 4 is a perspective view of a roller bearing assembly of the socket assembly of FIGS. 2 and 3.

Referring now to FIGS. 2-4, the socket assembly 22 includes a housing 26 which has an inner surface and an outer surface. The inner surface has an inner bore that extends along a central axis A from a lower wall 28 at a generally closed first end 30 to an open second end 32. The lower wall 28 has a lubricant opening which receives a grease fitting 34 (also known as a Zerk fitting) for channeling a lubricant, such as grease, into the inner bore. The housing 26 is preferably made as a monolithic piece of a metal, such as steel or an alloy steel, and may be shaped through any suitable process or combination of processes including, for example, forging, casting, machining from a billet, etc. In the exemplary embodiment, the housing 26 is a cartridge-style housing 26 in that it is configured to be inserted into an opening of the control arm body 24.

As shown in FIG. 2, the inner bore of the housing 26 has a progressively increasing diameter from the closed first end 30 to the open second end 32. Specifically, the inner bore has a first portion 36 with a generally constant first diameter adjacent the closed first end 30, a second portion 38 where the inner diameter of the housing 26 is curved and a third portion 40 with a generally constant second diameter adjacent the open second end 32. As shown, the second diameter of the third portion 40 is greater than the first diameter of the first portion 36. Between the second and third portions 38, 40, the housing 26 presents a shoulder 42 which faces towards the open second end 32.

The socket assembly 22 further includes a ball stud 44 with a ball portion 46 and a shank portion 48. The ball portion 46 is fully disposed in the inner bore of the housing 26, and the shank portion 48 projects out of the housing through the open second end 32. The ball portion 46 has a generally semi-spherically curved outer surface which may have one or more lubricant grooves formed therein. The ball stud 44 is preferably made as a single, monolithic piece of metal, such as steel or an alloy steel.

A backing bearing 50 is received in the first portion 36 of the inner bore between the ball portion 46 of the ball stud 44 and the lower wall 28 of the housing 26. The backing bearing 50 has a semi-spherically curved first bearing surface 52 which faces axially towards the second open end 32 of the housing 26. The curvature of the first bearing surface 52 is similar to the curvature of the curved outer surface of the ball portion 46 such that the ball portion 46 can slide along the first bearing surface 52. As shown in FIG. 4, the first bearing surface 52 has a lubricant opening that is aligned with the lubricant opening in the lower wall of the housing so that the lubricant can access the interface between the ball portion 46 and the first bearing surface 52. The first bearing surface 52 also has a plurality of lubricant grooves for distributing the lubricant across the first bearing surface 52. The backing bearing 50 is preferably made of a monolithic piece of metal, such as steel.

The socket assembly 22 also has an exit bearing 54 which is received in the third portion 40 of the inner bore. The exit bearing 54 has a semi-spherically curved second bearing surface 56 which has a similar radius of curvature as the outer surface of the ball portion 46 and the first bearing surface 52. The exit bearing 54 is preferably made as a monolithic piece of metal, such as steel.

The first and second bearing surfaces 52, 56 of the backing and exit bearings 50, 54 respectively are in slidable contact with opposite hemispheres of the ball portion 46 to allow the ball stud 44 to articulate and rotate relative to the housing 26. As shown in FIG. 3, in an assembled state, the exit bearing 54 is spaced axially from the backing bearing 50 within the inner bore of the housing 26.

The socket assembly 22 also includes a dust boot 58 which is made of an elastomeric material (such as rubber) and is sealed against the housing 26 and the shank portion 48 of the ball stud 44 for capturing the lubricant within and keeping contaminants out of the inner bore. The dust boot 58 extends from a first boot end, which has a radially outwardly extending flange 60, to a second boot end that is sealed against the shank portion 48 of the ball stud 44. The flange 60 is disposed in the inner bore of the housing 26 and is in direct contact with a top surface of the exit bearing 54.

As shown in FIG. 3, a cover plate 64 is positioned at an opposite axial side of the flange 60 of the dust boot 58 from the exit bearing 54. At the open second end 32, the housing 26 is bent (such as through swaging) to create a radially inwardly extending lip 66 that engages the cover plate 64 to capture the cover plate 64, the flange 60 of the dust boot 58, the exit bearing 54, the ball portion 46 of the ball stud 44, and the backing bearing 50 within the inner bore of the housing 26.

The backing bearing 50 has an outer diameter that is less than the first diameter of the first portion 36 of the inner bore such that the footprint, or outer perimeter, of the backing bearing 50, as viewed in cross-section, is smaller than the footprint of the first portion 36 of the inner bore. Thus, when the backing bearing 50 is received in the inner bore, an annular gap surrounds the backing bearing 50. The gap allows the backing bearing 50 to move, or float, in a radial direction relative to the housing 26 within the inner bore.

A washer spring 68 and a roller bearing assembly 70 are disposed in the inner bore of the housing 26 between the lower wall 28 and the backing bearing 50. The second washer spring 68 is elastically deformed, or compressed, to bias the curved first bearing surface 52 of the backing bearing 50 against the ball portion 46 of the ball stud 44 and maintain the slide-able contact between these components as they wear during the operating life of the socket assembly 22. As shown in FIG. 3, the washer spring 68 is substantially flattened such that it has a top face which is generally planar. The roller bearing assembly 70 is sandwiched between the washer spring 68 and the backing bearing 50 to provide a low friction interface which allows the backing bearing 50 and the ball stud 44 to more freely rotate about the central axis A relative to the housing 26. As shown in FIG. 4, the roller bearing assembly 70 includes a plurality of cylindrically shaped needle rollers 72 which are supported within a plurality of circumferentially spaced openings in a cage 74. The needle rollers 72 are oriented such that they extend lengthwise in a radial direction and are generally evenly spaced from one another in a circumferential direction around the central axis A. Any suitable number of needle rollers 72 may be provided. The needle rollers 72 directly contact the flattened washer spring 68 on one axial side of the roller bearing assembly 70 and the backing bearing 50 on the other axial side and, in operation, roll against these components to allow the backing bearing 50 to freely rotate about the central axis A. The roller bearing assembly 70 has been found to greatly reduce the torque required to rotate the ball stud 44 relative to the housing 26.

The backing bearing 50, the needle rollers 72, and the second washer spring 68 are all preferably made of hardened metals, such as steel or alloy steel. The cage 74 has a central opening which is aligned with the lubricant openings in the lower wall 28 of the housing 26 and the backing bearing 50 for conveying the lubricant across the roller bearing assembly 70. The lubricant in the housing 26 also provides necessary lubrication for the needle rollers 72 of the roller bearing assembly 70 to ensure a very long operating life.

Figure 7:
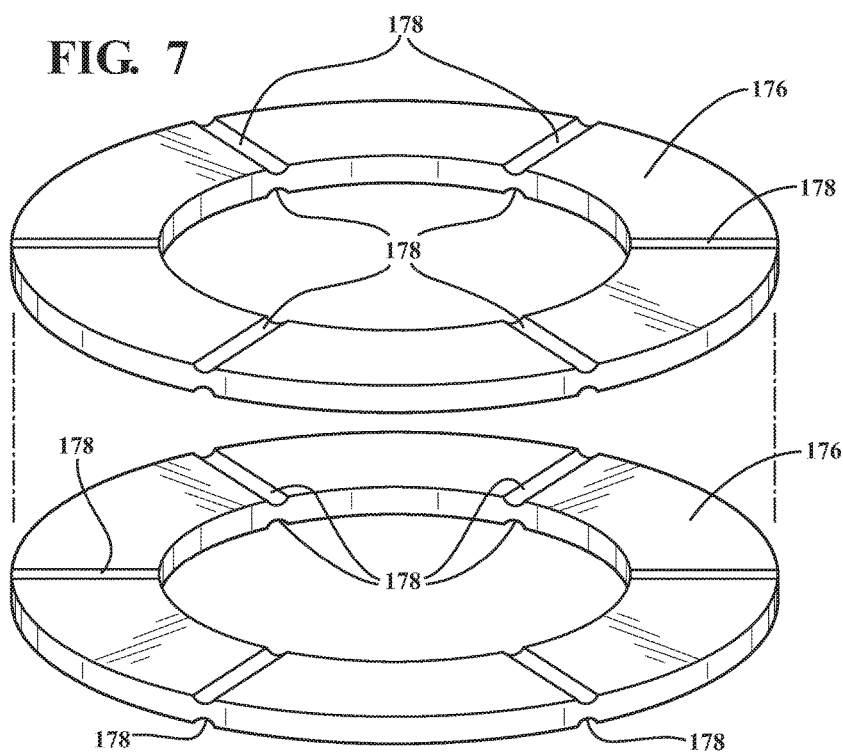
FIG. 7 is a perspective and exploded view of a pair of thrust washers from the socket assembly of FIGS. 5 and 6.
Figure 5:
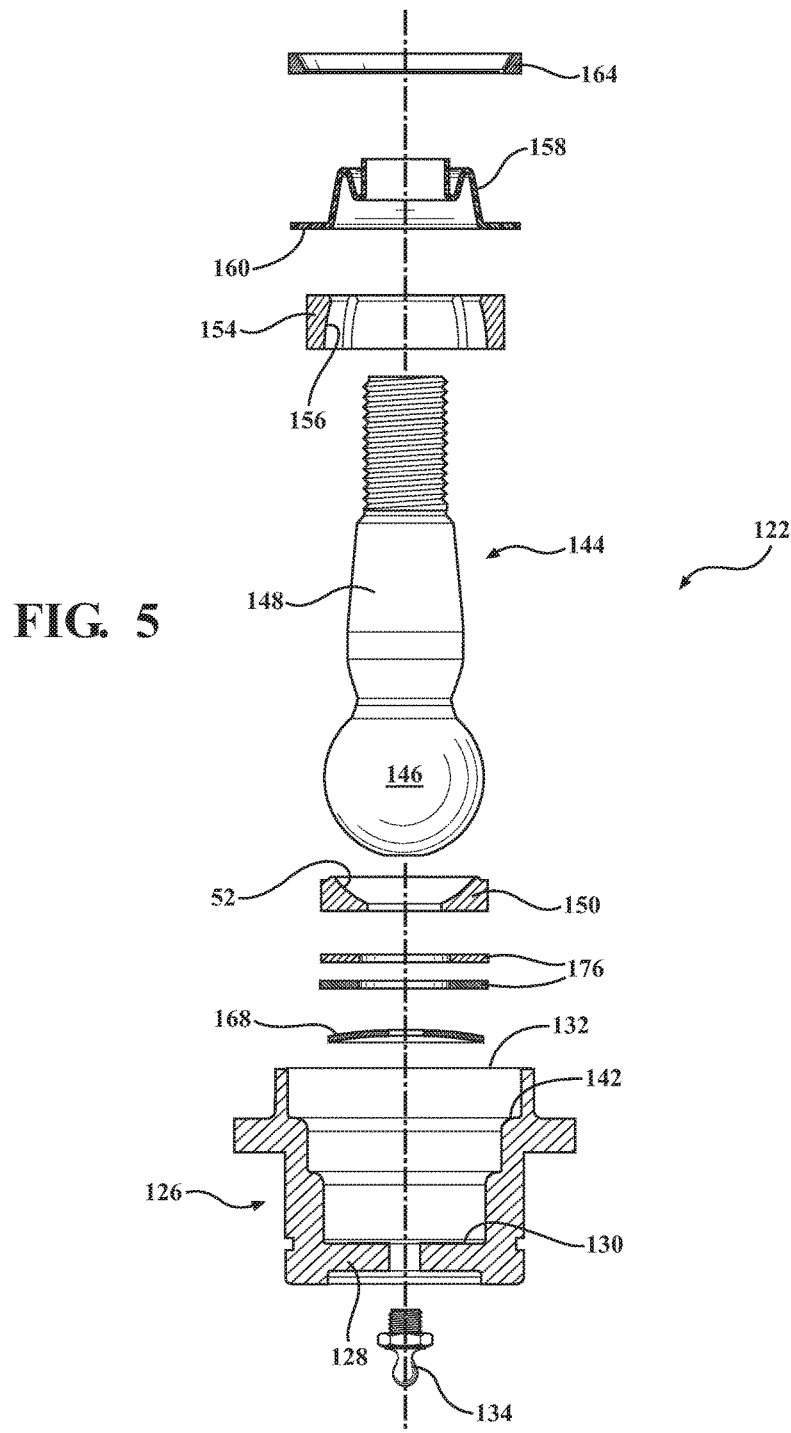
FIG. 5 is an exploded and partially cross-sectional view of a second exemplary embodiment of the socket assembly.
Figure 6:
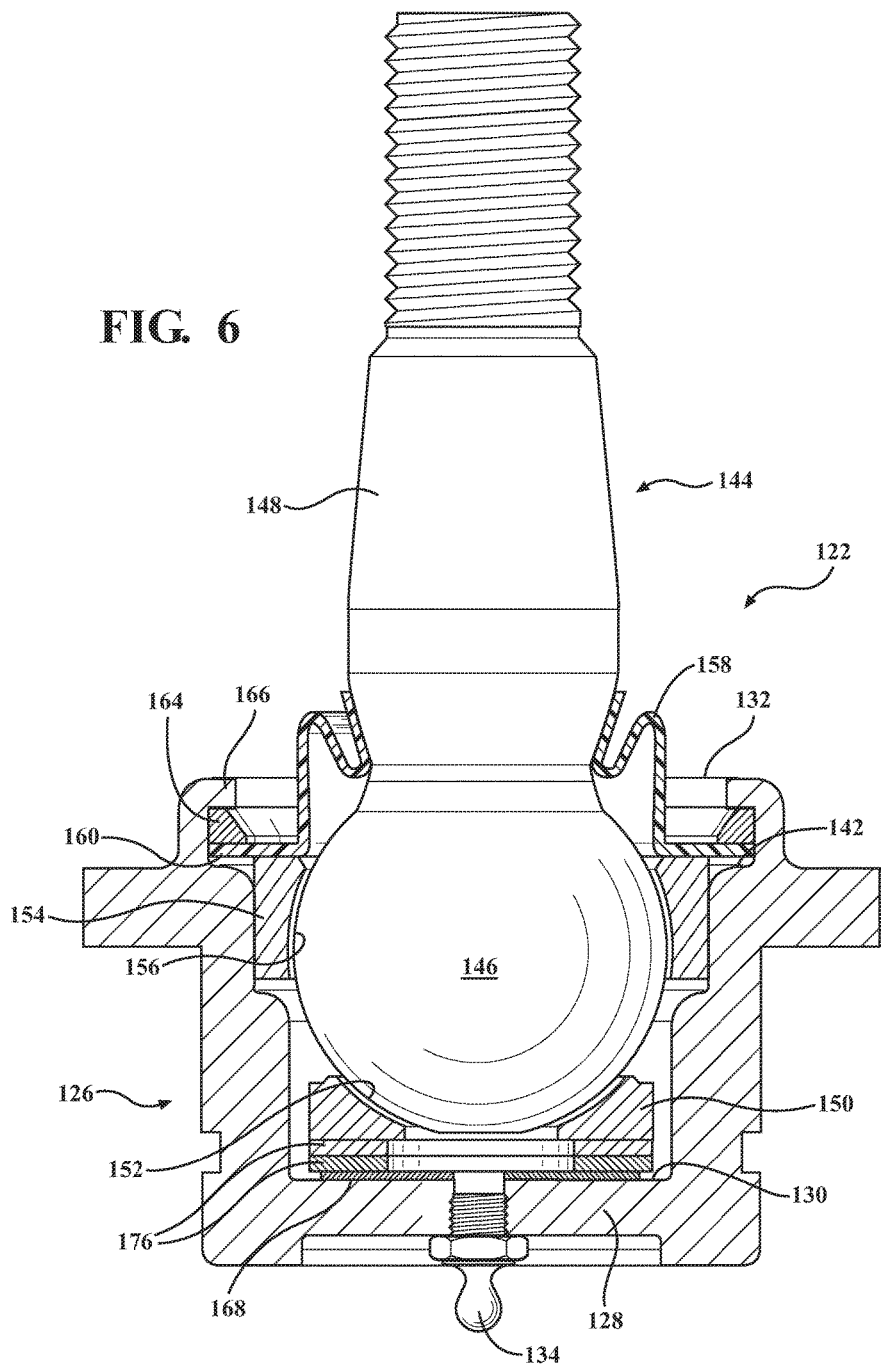
FIG. 6 is a partially cross-sectional view of the socket assembly of FIG. 5 in an assembled condition.

Referring now to FIGS. 5 and 6, a second exemplary embodiment of the socket assembly 122 is generally shown with like numerals, separated by a prefix of "1", indicating corresponding parts with the first exemplary embodiment discussed above. Rather than a roller bearing assembly 70, as found in the first embodiment, the second embodiment includes a pair of thrust washers 176 between the second washer spring 168 and the backing bearing 150. The thrust washers 176 are in a stacking relationship with one thrust washer 176 directly contacting the second washer spring 168 and the other thrust washer 176 directly contacting the backing bearing 150. As shown in FIG. 7, each of the thrust washers 176 has a generally planar top surface and a generally planar bottom surface. The top and bottom surfaces may be provided with radially extending lubricant grooves 178 which extend from central openings in the thrust washers 176 to outer peripheries of the thrust washers. In operation, the lubricant grooves 178 distribute the lubricant above, below and between the thrust washers 176 to allow the thrust washers 176 to more freely rotate relative to one another and to allow the backing bearing 150 to more freely rotate relative to the housing 126. Thus, similar to the roller bearing assembly 70 of the above-discussed embodiment, the thrust washers 176 reduce the torque required to rotate the ball stud 144 relative to the housing 126. The thrust washers 176 are preferably made of a hardened metal, such as steel or an alloy steel.

Obviously, many modifications and variations of the present invention are possible in light of the above teachings. It is, therefore, to be understood that within the scope of the appended claims, the invention may be practiced otherwise than specifically described. Additionally, it is to be understood that all features of all claims and all embodiments can be combined with each other, as long as they do not contradict each other.

What is claimed is:

1. A socket assembly, comprising:
   a housing with an inner bore which extends along a central axis from a closed first end to an open second end;
   a ball stud including a ball portion that is disposed in said inner bore of said housing and including a shank portion which projects out of said housing through said open second end;
   a backing bearing disposed in said inner bore and slidably supporting said ball portion of said ball stud;
   a roller bearing assembly disposed in said inner bore of said housing and operatively supporting said backing bearing and allowing free rotation of said backing bearing relative to said housing;
   said roller bearing assembly including a plurality of rollers which are spaced circumferentially from one another;
   a washer spring disposed in said inner bore between said roller bearing assembly and said closed first end of said housing for biasing said backing bearing against said ball portion of said ball stud;
   said washer spring being elastically deformed such that it has a substantially planar first surface; and
   wherein said rollers are in direct contact with said substantially planar first surface of said washer spring such that said rollers can roll along said washer spring.

2. The socket assembly as set forth in claim 1 wherein said roller bearing assembly is in direct contact with said backing bearing.

3. The socket assembly as set forth in claim 1 wherein said rollers are needle rollers.

4. The socket assembly as set forth in claim 3 wherein said roller bearing assembly further includes a cage with a plurality of openings that receive said needle rollers.

5. The socket assembly as set forth in claim 1 wherein said backing bearing is able to move in a radial direction within said inner bore of said housing.

6. The socket assembly as set forth in claim 1 wherein said socket assembly further includes an exit bearing which is disposed in said inner bore of said housing and supports an opposite hemisphere of said ball portion of said ball stud from said backing bearing.

7. A socket assembly, comprising:
   a housing with an inner bore which extends along a central axis from a closed first end to an open second end;
   a ball stud including a ball portion that is disposed in said inner bore of said housing and including a shank portion which projects out of said housing through said open second end;
   a backing bearing disposed in said inner bore and slidably supporting said ball portion of said ball stud;
   a pair of thrust washers disposed in said inner bore of said housing between said closed first end of said housing and said backing bearing and operatively supporting said backing bearing to allow low friction rotation of said backing bearing relative to said housing;
   one of said thrust washers being in direct contact with said backing bearing;
   a washer spring disposed in said inner bore of said housing between said thrust washers and said closed first end of said housing;
   wherein the one of said thrust washers that is not in direct contact with said backing bearing is in direct contact with said washer spring; and
   wherein said backing bearing is able to move in a radial direction within said inner bore of said housing.

8. The socket assembly as set forth in claim 7 wherein each of said thrust washers has a plurality of radially extending grooves for distributing lubricant.

9. The socket assembly as set forth in claim 7 wherein said washer spring is elastically deformed such that it has a substantially planar first surface.

* * * * *